Patented Oct. 18, 1949

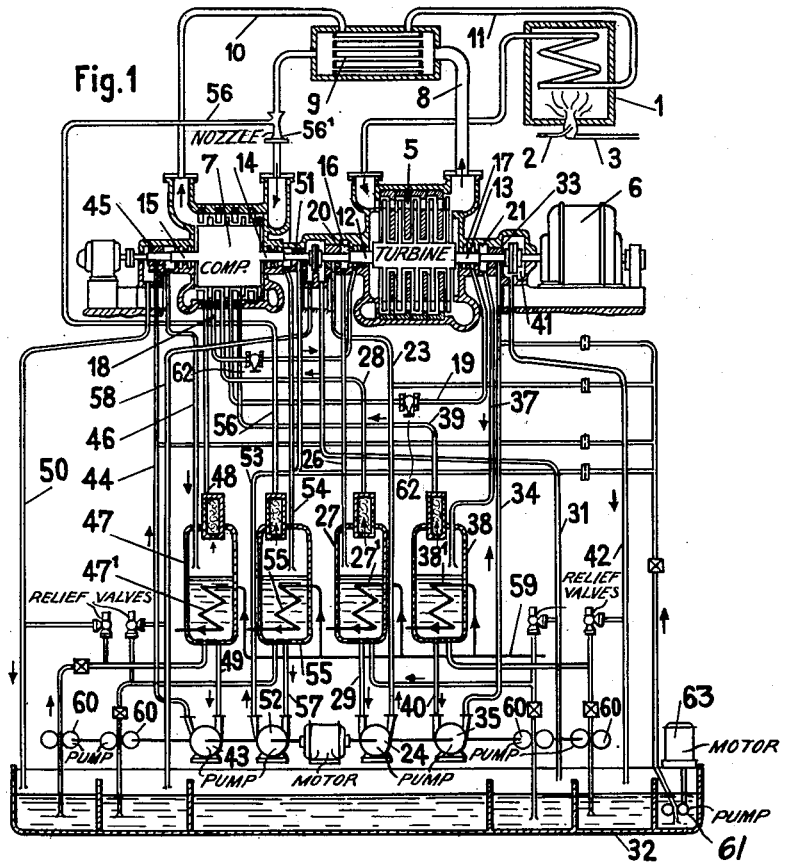

2,485,447

UNITED STATES PATENT OFFICE 2,485,447

SEALING ARRANGEMENT FOR THE SHAFTS OF TURBOMACHINES OF THERMAL POWER PLANTS IN WHICH THE GREATER PART OF A GASEOUS MEDIUM CONTINUOUSLY DESCRIBES A CLOSED CYCLE UNDER PRESSURE ABOVE ATMOSPHERIC

Curt Keller, Zurich, Switzerland, assignor to Escher Wyss Maschinenfabriken Aktiengesellschaft, Zurich, Switzerland, a corporation of Switzerland Application April 1, 1946, Serial No. 658,690
In Switzerland September 23, 1940

Section 1, Public Law 690, August 8, 1946
Patent expires September 23, 1960

4 Claims. (Cl. 60—59)

This invention relates to improvements in a shaft seal for rotating elements of turbo-machines of thermal power plants, in which the greatest part of a gaseous working medium continuously describes a closed cycle under pressure above atmospheric pressure, whereby the working medium, the temperature of which has been raised by a supply of heat from an outside source, is allowed to expand in at least one turbine while giving up energy externally, after which it is again brought to a higher pressure in at least one turbo-compressor.

In a plant of the above mentioned type it is particularly important that leakages of the working medium are prevented as far as possible at the places where the shafts of the turbo-machines are sealed from the atmosphere, since any losses of working medium may affect very detrimentally the efficiency of the plant. The proper sealing of the shafts in such plants presents great difficulties, as the pressure prevailing in the entire closed circuit substantially exceeds atmospheric pressure. Thus, the pressure prevailing at the point where the pressure of the whole circuit is lowest, may still amount to 10 atmospheres, whilst at the point of highest pressure within the circuit, 30 to 40 atmospheres may prevail. In contrast thereto the highest pressure occurring in gas turbines working on the principle of the open circuit is, as is well known, never higher than 3 to 4 atmospheres, whilst the lowest pressure encountered is about atmospheric. In thermal power plants working on the principle of the closed circuit, leakages of working medium should be prevented as far as possible since any gas escaping from the circuit must be replaced, and the fresh gas to be introduced into the circuit has to be compressed at least up to the lowest pressure prevailing within the circuit. This lowest pressure can, as already stated, amount to 10 atm. and more. Accordingly a relatively great amount of energy is required to bring the make-up working medium, preferably air of atmospheric pressure, to the pressure prevailing at the point where said make-up working medium is introduced into the circuit. The additional energy required for this purpose necessarily involves a corresponding deterioration of the efficiency of the whole plant.

The solution of the problem in question is made particularly difficult by the following three facts: the high pressure of the working medium circulating in the closed circuit, the prevailing high temperatures (up to 650° C.), particularly those at the high-pressure end of the turbine, and the requirement that the auxiliary media used for sealing purposes must be prevented from passing through the stuffing box into the closed circuit of the plant. These various difficulties are overcome according to the present invention by supplying at least to the stuffing boxes of the turbine as sealing medium gas tapped from the circuit of the primary working medium at a place where a higher pressure prevails than in the interior of the respective stuffing box, and by associating with each of said stuffing boxes a bearing space sealed against the atmosphere by a liquid. Each of these bearing spaces is then connected to a receptacle in which the sealing gas separates from the sealing liquid, the gas space of this receptacle being connected to a point of the closed circuit at which a lower pressure prevails than at the tapping point of the sealing gas for the respective stuffing box, whilst the liquid space of said receptacle is connected to a pump supplying the sealing liquid for the bearing space allotted to the respective stuffing box.

The regulation or governing of load fluctuations which arise in plants of the kind in question is usually effected by changing the density of the working medium describing the closed cycle approximately proportionally to the momentary power delivered externally by the turbine, the speeds of the turbine and compressor being maintained unchanged. When governing in such a manner the pressures at different points in the cycle vary approximately proportionally to the momentary power delivered externally by the turbine, so that when the object of the present invention is embodied in such a plant, the pressure of the sealing gas supplied to the stuffing boxes from the circuit described by the working gas of the plant automatically adjusts itself to the load of the plant, i. e. to the density of said gas. Thus, in principle, neither special governing means for adjusting to the load of the plant the pressure of the sealing gas to be supplied to the stuffing boxes nor a special compressor for producing the required sealing gas pressure are required. In this way it is possible to reduce the losses of working medium in the stuffing boxes to a minimum by means of devices of simple design, which require no manipulation by the operating staff. All this is mainly due to the fact that the ratio between the sealing gas pressure in the respective stuffing box and the pressure of the gas in the closed circuit remains the same at all loads of the plant, since only the absolute values of the respective pressures vary but not their relationship to one another. The directions of flow of the different currents of sealing gas and sealing liquid therefore remain unchanged at all loads of the plant, which is of particular importance.

In the accompanying drawing, a typical embodiment of the invention is illustrated.

In the figures

Fig. 1 illustrates in diagram a thermal power plant in which air continuously describes a closed cycle under pressure above atmospheric and in which the turbine is provided with a sealing arrangement according to the present invention.

Fig. 2 shows details of Fig. 1 on a larger scale.

Referring to the drawing, reference 1 denotes a heater, in which heat is supplied to air describing for the greater part a closed cycle at a pressure above atmospheric. To this heater 1 fuel is supplied through piping 2 and combustion air through piping 3. The air heated in this manner passes to a multi-stage air turbine 5 of the axial flow type, in which it expands, thereby giving up energy to a generator 6 and to a rotary compressor 7 which may be, for instance, of the axial flow type. The air issuing from the turbine 5 passes through a piping 8 into a heat exchanger 9 designed as a countercurrent apparatus, where it gives up heat to that part of the working medium which is supplied at a higher pressure to said heat exchanger 9 from the axial flow compressor 7 through piping 10. This last mentioned part of the working medium flows, after it has been heated in the heat exchanger 9, through a piping 11 to the heater 1.

Reference 12 denotes the part of the turbine shaft that has to be sealed on the high pressure side of the air turbine 5, and 13 the part of said shaft to be sealed on the low pressure side. Further, reference 14 denotes the part of the shaft of the axial flow compressor 7 which has to be sealed on the suction side and 15 the part of said shaft to be sealed on the pressure side of the compressor. To the stuffing boxes 16 and 17 (see particularly Fig. 2) provided for sealing the parts 12 and 13 respectively, of the turbine shaft, air tapped from the closed working circuit of the plant is supplied as a sealing medium. Such air is tapped from the circuit at a point at which a higher pressure than in the interior of the respective stuffing boxes 16 and 17 prevails. In order that such sealing medium may be supplied, a piping 18 connects a high-pressure stage of the compressor 7 to the interior of the stuffing box 16, and a piping 19 connects a stage of a lower pressure of the compressor 7 to the interior of the stuffing box 17. The sealing air escaping outwards through the stuffing box 17 passes into a space 21 (Fig. 2), whilst the sealing air escaping outwards through the stuffing box 16 passes into a space 20 which is sealed against the atmosphere by a liquid sealed stuffing box 22. Sealing liquid is supplied to the latter by a pump 24 through a piping 23; a part of the sealing liquid delivered by the pump 24 also passes into a bearing 25 for the turbine shaft, the bearing 25 being arranged adjacent to the stuffing box 22. The sealing liquid escaping inwards through the stuffing box 22 collects in the space 20 from which it flows, together with the sealing air also escaping into this space, through a piping 26 into a receptacle 27, where the sealing air separates from the sealing liquid. This air flows back to the circuit traversed by the working medium of the power plant through a piping 28, which terminates at a point in the interior of the compressor 7 where a lower pressure than at the tapping point of the sealing air for the stuffing box 16 prevails. The liquid space of the receptacle 27 is connected to the pump 24 through a piping 29. The sealing liquid escaping outwards through the stuffing box 22 and the bearing 25 passes into a space 30 (Fig. 2) from which it flows away through a piping 31 into a collecting tank 32 which is subdivided by intermediate walls into compartments.

The stuffing box space 21 on the low pressure side of the air turbine 5 is sealed towards the atmosphere in a similar manner by a stuffing box 33 supplied with sealing liquid by a pump 35 through piping 34. A part of the liquid supplied by the pump 35 also passes into a bearing 36 for the turbine shaft arranged adjacent to the stuffing box 33. The sealing liquid escaping inwards through the stuffing box 33 collects in the space 21 where it mixes with the sealing air escaping through the stuffing box 17 also into said space 21. The resulting mixture flows from the space 21 through a piping 37 into a receptacle 38 where the sealing air again separates from the sealing liquid. The former returns through a conduit 39 into the circuit of the working medium of the plant, since said conduit terminates at a place in the interior of the compressor 7 where a lower pressure prevails than at the place where the sealing air for the stuffing box 17 is tapped. The liquid space of the receptacle 38 is connected through a piping 40 to the pump 35. The liquid escaping outwards through the stuffing box 33 and the bearing 36 passes to a space 41 (Fig. 2), from which it flows away through a piping 42 into a compartment of the collecting tank 32.

The stuffing box 45 sealing the section 15 of the compressor shaft is supplied, in the embodiment illustrated, only with sealing liquid delivered by a pump 43 through a piping 44. The sealing liquid escaping inwards through the stuffing box 45 mixes with air which escapes along the shaft section 15 of the compressor 7. The resulting mixture of air and liquid flows through a piping 46 into the receptacle 47 where the air separates again from the sealing liquid. The separated air flows back through a piping 48 to the circuit of the working medium of the plant, whilst the liquid separated in the receptacle 47 flows back to the pump 43 through a piping 49. The part of the sealing liquid escaping outwards in the stuffing box 45 flows through a piping 50 into a compartment of the collecting tank 32.

The stuffing box 51 on the suction side of the compressor 7 likewise only receives sealing liquid from a pump 52 through a piping 53. The sealing liquid mixing in the stuffing box 51 with the air escaping along the shaft section 14 flows away through a piping 54 into a receptacle 55 where the air again separates from the liquid. The action produced by a nozzle 56[1] causes the air separated in the receptacle 55 to flow back through a piping 56 into the suction pipe of the compressor 7, whilst the sealing liquid returns through a piping 57 to the pump 52. The sealing liquid escaping outwards in the stuffing box 51 flows through a piping 58 into a compartment of the collecting tank 32.

In order that the receptacles 27, 38, 47 and 55 can serve simultaneously as liquid coolers, coils $27^1$, $38^1$, $47^1$ and $55^1$ respectively, are provided. These coils are connected to a common piping 59 supplying a cooling medium. The reference 60 denotes pumps which force the sealing liquid collected in the tank 32 back into the receptacles 27, 38, 47 and 55. Relief valves are applied to the discharge lines of these pumps to limit the delivery pressure. The relief valves are identified by legends on Fig. 1. The reference numeral 61 denotes an auxiliary pump forcing sealing liquid into the different stuffing boxes when the plant is started up. The pumps 60 and pumps 24, 35, 43 and 52 are driven as a unit by one motor as shown and the pump 61 by another motor 63.

Owing to the fact that the stuffing boxes 16 and 17 of the turbine 5 receive through pipings 18 and 19 respectively, air tapped from the circuit of the thermal power plant, a sealing gas pressure is automatically set up in these stuffing boxes which is always proportional to the momentary load of the power plant. As a result of this fact, losses of working medium at the stuffing boxes of the air turbine 5 are prevented in a simple manner. Thereby the sealing air for the stuffing boxes is tapped from a point of the circuit described by the working medium where a low temperature prevails, so that when using, for instance, oil as sealing liquid the latter will not ignite when it comes in contact with sealing air. Since to each stuffing box of the rotary machines is also allotted a liquid seal, practically no air can escape from the air circuit of the power plant into the atmosphere.

The hereinbefore described sealing means only involves small losses of energy, since only little pressure is lost when sealing air escapes through the stuffing boxes.

Where necessary, throttling means may be provided in order to regulate the quantity of sealing air supplied to the stuffing boxes from the compressor in such a manner that only just the required minimum quantity of sealing air passes through the stuffing boxes. The reference 62 denotes such means.

What I claim is:

1. In a shaft sealing arrangement for turbomachines of thermal power plants, in which the greater part of a gaseous medium continuously describes a closed circuit under pressures above atmospheric pressure, and in which circuit, compressed working medium, the temperature of which has been raised by a supply of heat from an outside source, is caused to expand in at least one turbine while giving up energy externally, after which it is again compressed in at least one turbo-compressor; the combination of shaft-sealing stuffing boxes of the gas-sealed type; means for supplying to said stuffing boxes, as the sealing medium, gas tapped from said closed circuit at a point where a higher pressure prevails than that against which the respective stuffing box seals; means including liquid seals for isolating from the atmosphere spaces at the outer ends of said gas-sealed stuffing boxes; means for supplying sealing liquids to said liquid seals; separators for gas and liquid associated with respective isolated spaces; means for supplying the gases separated in said separators to at least one point in said closed circuit at which prevails a lower pressure than that at the tapping point of the sealing gas for respective gas-sealed stuffing boxes, and means for supplying the liquid separated in each separator to respective liquid seals.

2. In a shaft sealing arrangement for turbomachines of thermal power plants, in which the greater part of a gaseous medium continuously describes a closed circuit under pressures above atmospheric pressure, and in which circuit, compressed working medium, the temperature of which has been raised by a supply of heat from an outside source, is caused to expand in at least one turbine while giving up energy externally, after which it is again compressed in at least one turbo-compressor; the combination of shaft-sealing stuffing boxes of the gas-sealed type; means for supplying to said stuffing boxes, as the sealing medium, gas tapped from said closed circuit at a point where a higher pressure prevails than that against which the respective stuffing box seals; means comprising combined shaft bearings and stuffing boxes serving to isolate from the atmosphere spaces at the outer ends of respective gas-sealed stuffing boxes; means serving to supply sealing liquids to each of said combined bearings and stuffing boxes; gravity gas and liquid separators associated with respective isolated spaces; means connecting each separator to discharge separated gas to at least one point in said closed circuit at which prevails a lower pressure than that at the tapping point of the sealing gas for respective gas-sealed stuffing boxes; and means connecting each separator to discharge liquid to respective means serving to supply sealing liquid.

3. In a shaft sealing arrangement for turbomachines of thermal power plants, in which the greater part of a gaseous medium continuously describes a closed circuit under pressures above atmospheric pressure, and in which circuit, compressed working medium, the temperature of which has been raised by a supply of heat from an outside source, is caused to expand in at least one turbine while giving up energy externally, after which it is again compressed in at least one turbo-compressor; the combination of shaft-sealing stuffing boxes of the gas-sealed type; means for supplying to said stuffing boxes, as the sealing medium, gas tapped from said closed circuit at a point where a higher pressure prevails than that against which the respective stuffing box seals; throttling means for adjusting the rate of supply of said sealing gas; means including secondary shaft seals of the liquid-sealed type, serving to isolate from the atmosphere spaces at the outer ends of respective gas-sealed stuffing boxes; means for supplying sealing liquid to each of said secondary shaft seals; gas and liquid separators associated with respective isolated spaces, each separator having a gas space and a liquid space; means connecting the gas space of each separator to a point of said closed circuit at which prevails a lower pressure than that at the tapping point of the sealing gas for the respective gas-sealed stuffing box; and means connecting the liquid space of each separator to respective means for supplying sealing liquid.

4. In a shaft sealing arrangement for turbomachines of thermal power plants, in which the greater part of a gaseous medium continuously describes a closed circuit under pressures above atmospheric pressure, and in which circuit compressed working medium, the temperature of which has been raised by a supply of heat from an outside source, is caused to expand in at ternally, after which it is again compressed in at least one turbo-compressor; the combination of shaft-sealing stuffing boxes of the gas-sealed type; means for supply to said stuffing boxes, as the sealing medium, gas tapped from said closed circuit at a point where a higher pressure prevails than that against which the respective stuffing box seals; means comprising combined shaft bearings and stuffing boxes serving to isolate from the atmosphere spaces at the outer ends of respective gas-sealed stuffing boxes; pumps serving to supply a sealing liquid to each of said combined bearings and stuffing boxes; gas and liquid separators in communication with respective isolated spaces and each having a gas space and a liquid space; means connecting the gas space of each separator to a point of said closed circuit at which prevails a lower pressure than that at the tapping point of the sealing gas for the respective gas-sealed stuffing box; and means connecting the liquid space of each separator to a corresponding one of said pumps.

CURT KELLER.

REFERENCES CITED

The following references are of record in the file of this patent:

UNITED STATES PATENTS

| Number | Name | Date |
|---|---|---|
| 1,759,074 | Van Rijswijk | May 20, 1930 |

Certificate of Correction

Patent No. 2,485,447                                         October 18, 1949

CURT KELLER

It is hereby certified that error appears in the printed specification of the above numbered patent requiring correction as follows:

Column 7, line 4, for the word "supply" read *supplying*;

and that the said Letters Patent should be read with this correction therein that the same may conform to the record of the case in the Patent Office.

Signed and sealed this 7th day of February, A. D. 1950.

[SEAL]

THOMAS F. MURPHY,
*Assistant Commissioner of Patents.*